June 24, 1952 | H. H. SCHOTANUS À STERINGA IDZERDA | 2,601,416

TUBE GENERATOR

Filed Feb. 15, 1949

INVENTOR.
HENRIKUS HANSO SCHOTANUS à STERINGA IDZERDA
BY Fred M Vogel
AGENT.

Patented June 24, 1952

2,601,416

UNITED STATES PATENT OFFICE 2,601,416

TUBE GENERATOR

Henrikus Hanso Schotanus à Steringa Idzerda, Eindhoven, Netherlands, assignor to Hartford National Bank and Trust Company, Hartford, Conn., as trustee Application February 15, 1949, Serial No. 76,562
In the Netherlands April 12, 1948

5 Claims. (Cl. 250—36)

The invention relates to a valve oscillator for producing oscillations of adjustable frequency, comprising a back-coupled amplifier, the frequency of the oscillations produced being determined by a phase-shifting feedback network composed of reactances of identical kind and of ohmic resistances. In accordance with the nature of the reactances said oscillators are referred to as RC- or as RL-oscillators.

An example of such an oscillator is illustrated in Fig. 1 of the accompanying drawing, with reference to which the operation will be set out and explained. The output terminals 1 and 2 of an amplifier 3 are connected to a network 4, which is shown to comprise resistances and condensers. This network is shown to comprise two members. The first, upper member comprises the series combination of a resistance 5 and a condenser 6 and the second, lower member comprises the parallel-combination of a resistance 7 and a condenser 8. The two members are connected in series between the output terminals of the amplifier. The voltage across the member formed by 7 and 8 is supplied to the input terminals 9 and 10 of the amplifier. The feedback network 4 may be regarded here as a potentiometer. If it is assured that phase-shift does not occur in the amplifier 3 for the generated frequency and if the resistances 5 and 7 are designated $R_1$ and $R_2$ respectively and the condensers 6 and 8 $C_1$ and $C_2$ respectively, the frequency produced is found to be:

$$\omega=\frac{1}{\sqrt{R_1R_2C_1C_2}}$$

As is well known, for this frequency the input voltage of the amplifier, that is to say the voltage across the member formed by 7 and 8 is either in phase or in phase-opposition with the output voltage of the amplifier, that is to say with the voltage across the entire network. Apart from the value of the frequency produced, the so-called voltage partition ratio Z of the network 4 is furthermore essential which is the ratio between the voltage across the lower member and that across the two members together. If $R_1=R_2$ and $C_1=C_2$, the voltage-partition ratio for the network shown Z is equal to $$\frac{1}{3}$$

In this case, the amplification of the amplifier must not be smaller than the reverse thereof, which is 3. Generally, the amplifier is designed for a considerably greater amplification, which is reduced to the correct value by negative feedback. As is well known, when oscillations are produced, the amplitude of the oscillations is always adjusted to be such that the amplification has precisely a value which is equal to the converse of the voltage-partition ratio of the network employed.

The frequency of the oscillations produced may be adjusted by variation of the value of one or more of the elements 5, 6, 7 and 8. If a large frequency range is desired, the condensers 6 and 8, for example, are arranged so as to be variable continuously and the resistances 5 and 7 so as to be variable in a number of steps a number of frequency bands being thus obtained which is equal to the number of said steps and the frequency being thus adapted to be adjusted within each band by variation of the condensers. As an alternative, the value of the condensers may, of course, be varied stepwise and the value of the resistances continuously. Alternatively, such an oscillator is adapted to operate with inductances instead of with condensers.

It is often desirable that apart from the possibility of adjusting the frequency a possibility of producing a given detuning of this frequency should be available. In some cases it will be sufficient that a fixed detuning can be provided but in general also this detuning will be required to be capable of being varied continuously, it being desirable that the detuning which is either fixed or adjustable, should vary, with the adjusted frequency in such manner that the ratio between the detuning provided and the frequency adjusted is independent of the frequency adjusted, the detuning being consequently expressed in a relative measure, hence, for example, in percent, of the adjusted frequency or in musical intervals calculated from the adjusted frequency and irrespective thereof. Such a possibility of detuning considerably simplifies frequent measurements, such as ascertaining the circuit quality, plotting of resonance curves.

For this purpose one of the resistances or reactances of the network might be provided to be variable. Obviously, those elements which already must be arranged so as to be variable for adjustment of the frequency in each of the bands cannot be used for this purpose. However, in each of the bands required for obtaining a sufficiently large frequency range the other elements have a different value. The difficulty might be solved by realising, for example, resistance 7 in the example shown in Fig. 1, as a potentiometer for each of the bands. Apart from the cost entailed thereby, there is a further disadvantage, since it is found that this variation of the resistance 7 affects the voltage-partition ratio Z of the network. On adjustment of the detuning, this ratio will consequently change and the amplifier 3 will be adjusted to an amplification which corresponds with this changed ratio. It is found to be attended by a variation of the value of the adjusted amplitude and this is undesirable. This disadvantage may be obviated by varying resistance 5 in the same sense as resistance 7 but for realising the desired possibility of detuning described above this would entail the necessity of providing two potentiometers for each band. In view of the large number of bands required to ensure a sufficiently large frequency range, this cannot be carried out from considerations of cost and space.

This invention provides a valve oscillator with which the above disadvantages are obviated and the starting point is formed by a valve oscillator as referred to in the preamble, the feedback network of which consists of two members, the first of which comprises the series combination of an ohmic resistance R and a reactance X and the second of which comprises the parallel combination of an ohmic resistance $\beta$R and a reactance $$\frac{X}{\alpha}$$

the two members being connected in series between the output terminals of the amplifier and the second member being connected between the input terminals of the amplifier.

The invention exhibits the feature that in the second member of the network in series with the ohmic resistance and with the reactance respectively a voltage $\Delta$E and $\Delta_2$E respectively are effective, each of said voltages exhibiting a phase-shift of a whole multiple of 180° relatively to the voltage E across the entire network and being adapted to be varied in such manner that the value of $$\frac{\Delta_1}{\beta}+\alpha\Delta_2$$

remains at least substantially unvaried.

As will be explained more fully this results in the said possibility of detuning being obtained and in the case of variation of the detuning (by simultaneous variation of $\Delta_1$ and $\Delta_2$ in such manner that $$\frac{\Delta_1}{\beta}+\alpha\Delta_2$$

remains constant) the voltage-partition ratio Z of the network, and hence also the amplitude, remaining constant.

In order that the invention may be more clearly understood and readily carried into effect, it will now be described more fully with reference to the accompanying drawing, of which Fig. 1, which shows diagrammatically a known valve oscillator, was already referred to.

Figure 1:
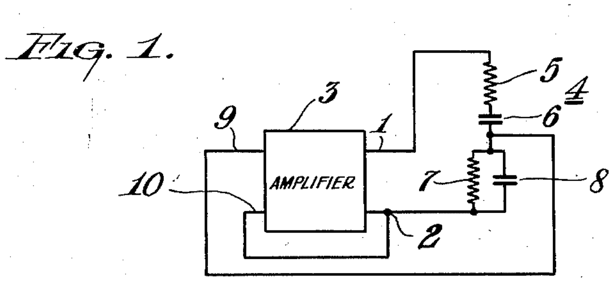
Figure 2:
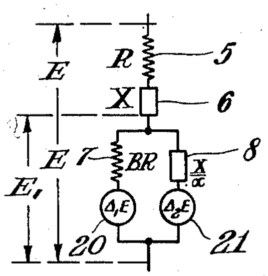
Fig. 2 shows a network for use with a valve oscillator according to the invention.

The network shown in Fig. 2 primarily corresponds with that used in the valve oscillator shown in Fig. 1, 5 and 7 designates having a value R and $\beta$R, 6 and 8 designate similar reactances having a value X and $X/\alpha$. Effective in series with the ohmic resistance 7 is a voltage represented symbolically by an oscillator 20 having a value $\Delta_1$E. Effective in series with the reactance 8 is a voltage having a value $\Delta_2$E, represented symbolically by an oscillator 21, E designating the voltage across the entire network, and $\Delta_1$ and $\Delta_2$ having positive or negative values and being usually small as compared with one.

The modulus of the voltage-partition ratio Z is thus found to be, if higher powers of $\Delta_1$ and $\Delta_2$ relatively to 1 are neglected:

$$\frac{E_1}{E_2}=\frac{\beta}{\alpha\beta+\beta+1}\left(1+\frac{\Delta_1}{\beta}+\alpha\Delta_2\right)$$

Consequently if $\Delta_1$ and $\Delta_2$ are varied simultaneously in such manner that $$\frac{\Delta_1}{\beta}+\alpha\Delta_2$$

remains constant, Z also remains constant and variation of the amplitude no longer occurs. It is found that a simultaneous variation of $\Delta_1$ and $\Delta_2$ such that Z remains constant results in a detuning constant in an absolute measure (for example in percent of the adjusted frequency) irrespective of the adjusted frequency. This detuning is furthermore directly proportional to the variation made in $\Delta_1$ and $\Delta_2$.

In the foregoing the voltage sources 20 and 21 are assumed to have an internal impedance which is negligible compared with the impedance of the elements 7 and 8. This condition may be readily fulfilled in practice, for example in the manner shown in Fig. 3.

The voltages introduced in series with resistances 7 and 8 are derived here from the voltage E. This has the advantage that the voltages $\Delta_1$E and $\Delta_2$E are supplied by the amplifier already available. If these voltages are required to be derived from the voltage $E_1$, this may be effected, for example, by connecting a separate amplifier to the lower member of the network of Fig. 2, said amplifier deriving the voltages $\Delta_1$E and $\Delta_2$E from the said voltage E. In this case said amplifier is, however, required to have an input impedance which is high as compared with the two members of the network, since otherwise the frequency produced is affected.

Figure 3:
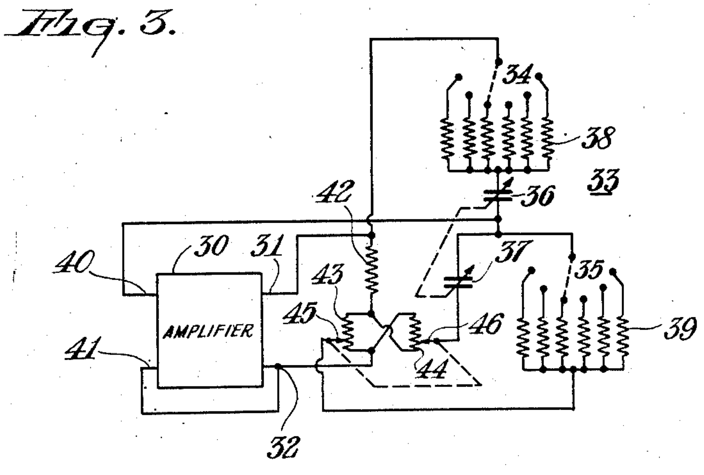
Fig. 3 shows diagrammatically a valve oscillator constructed in accordance with the invention.

The valve oscillator shown in Fig. 3 comprises an amplifier 30. A network 33 is connected across the output terminals. The valve oscillator is arranged for six bands, one of which is selected with the use of the coupled switches 34 and 35. In this network the resistances corresponding to 5 and 7 of Fig. 2, are equal and constructed to be variable in six steps. The continuous adjustment of the frequency within each frequency band is effected with the use of identical, coupled condensers 36 and 37, which are constructed to be continuously variable. While the upper member of the network 33 comprises a series combination of the condenser 36 and one of the six resistances 38 the lower member comprises a parallel combination of the condenser 37 and one of the resistances 39. The voltage across the lower member of the network is fed to the input terminals 40 and 41 of the amplifier 30. Connected across the output terminals of this amplifier is also the series combination of an ohmic resistance 42 on the one hand and the parallel combination of potentiometers 43 and 44 on the other hand. Hence, the terminal 32 and each of the two contact arms 45 and 46 of said potentiometers have effective between them variable voltages which are in phase with the output voltage of the amplifier and hence with the voltage E across the entire network. The contact arm 46 is connected in the manner shown to the variable condenser 37 and contact arm 45 to the resistances 39. The voltages designated $\Delta_1E$ and $\Delta_2E$ are thus introduced in series with the condenser 37 and in series with the resistance 39 connected into circuit for a definite band respectively the contact arms 45 and 46 of the potentiometers being mechanically coupled and these potentiometers being of equal value. Since both the resistances and the reactances (in this case condensers) are identical $\alpha=\beta=1$, so that the condition for $\Delta_1$ and $\Delta_2$ becomes: $\Delta_1+\Delta_2$ is constant. The illustrated arrangement of the potentiometers actually ensures that $\Delta_1+\Delta_2$ is constant here. By displacing the intercoupled potentiometer arms 45 and 46 it is thus possible to produce a desired detuning, the voltage-partition ratio remaining constant, as explained hereinbefore and hence also the amplification of the amplifier 30, so that variation of the adjusted amplitude of the oscillations produced in the case of variation of the detuning is avoided.

In one embodiment the two potentiometers had a value of 4.4 ohms and the smallest of the resistances 39 had a value of 7kΩ, the condenser 37 also having an impedance of 7kΩ for the generated frequency, as follows from the formula:

$$\omega=\frac{1}{RC} \text{ or } \frac{1}{\omega C}=R$$

and the condition that the input impedances of the voltage sources producing the voltages $\Delta_1E$ and $\Delta_2E$ should be small as compared with the impedances connected in series therewith was therefore duly fulfilled.

A valve oscillator according to this embodiment may therefore be provided not only with a main scale which indicates the adjusted frequency in the absence of detuning and which may be calibrated in cycles/sec. but also with a detuning scale on which the adjusted detuning is indicated, expressed in percent of the adjusted frequency, in musical intervals calculated from the adjusted frequency or in a different suitable relative measure related to the adjusted frequency.

The voltages $\Delta_1E$ and $\Delta_2E$ are supplied here by the amplifier provided in the oscillator but may be derived with the use of a separate amplifier from the voltage E′ or the voltage $E_1$.

Referring to the embodiment shown in Fig. 3 $\Delta_1+\Delta_2$ is equal to a positive constant, since $(\Delta_1+\Delta_2)E$ is exactly equal to the voltage across the two potentiometers. Since $\Delta_1$ and $\Delta_2$ do not become negative here (the introduced voltages being thus in phase opposition with E and E′) the voltages $\Delta_1E$ and $\Delta_2E$ are here both in phase with E and E′. However, this is in no sense essential. If $\Delta_1+\Delta_2$ is chosen to be zero, the introduced voltages are invariably in phase opposition. Even in the case of Fig. 3, in which $\Delta_1+\Delta_2$ is positive it is possible to make either $\Delta_1$ or $\Delta_2$ negative so long as $(\Delta_1+\Delta_2)$ remains constant and use may be made of a transformer for reversing the phase of either of the voltages $\Delta_1E$ and $\Delta_2E$.

If $(\Delta_1+\Delta_2)$ is not rigorously constant but approximately constant, an improvement is nevertheless ensured and the amplitude variation resulting from the detuning are already sufficiently small for many purposes.

The potentiometers in Fig. 3 may be replaced by fixed resistances and this permits of introducing a fixed detuning of, say 1% or a musical interval of the value of half a tone interval.

What I claim is:

1. An oscillation generator adjustable in frequency comprising an amplifying device having input and output terminals, a frequency-determining regenerative network for said device exhibiting a variable phase-shift as a function of frequency, said network including a first element constituted by a resistance having a value R connected in series with a reactance having a value X and a second element constituted by a resistance having a value $\beta$R connected in parallel with a reactance having a value $$\frac{X}{\alpha}$$

the first and second elements being serially connected across said output terminals, the second element also being connected across said input terminals, the voltage developed across said output terminals having a value E, and a system to detune the generator from the frequency of oscillation as determined by said network, said system including means to introduce into said second element in series with the resistance thereof a first voltage having a value $\Delta_1E$ and to introduce in series with the reactance thereof a second voltage having a value $\Delta_2E$, said first and second voltages being shifted in phase a whole multiple of 180 degrees relative to the voltage E, and means simultaneously to vary the values of the first and second voltages so that the value of $$\frac{\Delta_1}{\beta}+\alpha\Delta_2$$

remains substantially unvaried.

2. An oscillation generator adjustable in frequency comprising an amplifying device having input and output terminals, a frequency-determining regenerative network for said device exhibiting a variable phase-shift as a function of frequency, said network including a first element constituted by a resistance having a value R connected in series with a capacitance having a value X and a second element constituted by a resistance having a value $\beta$R connected in parallel with a capacitance having a value $$\frac{X}{\alpha}$$

the first and second elements being serially connected across said output terminals, the second element also being connected across said input terminals, the voltage developed across said output terminals having a value E, and a system to detune the generator from the frequency of oscillation as determined by said network, said system including means to obtain from the output terminals of said device a first voltage having a value $\Delta_1E$ and to introduce said first voltage into said second element in series with the resistance thereof and to obtain a second voltage having a value $\Delta_2E$ and to introduce said second voltage into said second element in series with the capacitance thereof, said first and second voltages being shifted in phase a whole multiple of 180 degrees relative to the voltage E, and means simultaneously to vary the values of the first and second voltages so that the value of $$\frac{\Delta_1}{\beta}+\alpha\Delta_2$$

remains substantially unvaried.

3. An oscillation generator adjustable in frequency comprising an amplifying device having input and output terminals, a frequency-determining regenerative network for said device exhibiting a variable phase-shift as a function of frequency, said network including a first element constituted by a resistance having a value R connected in series with a reactance having a value X and a second element constituted by a resistance having a value $\beta$R connected in parallel with a reactance having a value $$\frac{X}{\alpha}$$

the first and second elements being serially connected across said output terminals, the second element also being connected across said input terminals, the voltage developed across said output terminals having a value E, and a system to detune the generator from the frequency of oscillations as determined by said network, said system including a fixed resistor connected in series with a pair of parallel connected potentiometers across said output terminals, said potentiometers each having a movable tap one of which is connected in series with the resistance and the other of which is connected in series with the reactance in said second element, and means simultaneously to adjust the movable taps on said potentiometers.

4. An arrangement, as set forth in claim 3, wherein the combined ohmic value of said series connected potentiometers and said fixed resistor is small relative to the ohmic value of the resistance in said second element.

5. An arrangement, as set forth in claim 3, wherein the reactances in said first and second elements are constituted by variable capacitors and further including means simultaneously to adjust said variable capacitors.

HENRIKUS HANSO SCHOTANUS
À STERINGA IDZERDA.

REFERENCES CITED

The following references are of record in the file of this patent:

UNITED STATES PATENTS

| Number | Name | Date |
|---|---|---|
| 2,186,571 | Beale | Jan. 9, 1940 |
| 2,444,084 | Artzt | June 29, 1948 |

FOREIGN PATENTS

| Number | Country | Date |
|---|---|---|
| 524,314 | Great Britain | Aug. 2, 1940 |

OTHER REFERENCES

Brode, Abstract Serial No. 784,984, published January 3, 1950.